(No Model.) 3 Sheets—Sheet 1.

T. COLDWELL.
LAWN MOWER.

No. 426,984. Patented Apr. 29, 1890.

Witnesses:
Jas. E. Hutchinson.
Henry C. Hazard.

Inventor:
Thos. Coldwell, by
Rindle and Russell, his Attys.

(No Model.) 3 Sheets—Sheet 2.

T. COLDWELL.
LAWN MOWER.

No. 426,984. Patented Apr. 29, 1890.

Witnesses:
Jas. E. Hutchinson.
Henry C. Hazard.

Inventor:
Thos. Coldwell, by
Prindle and Russell, his Attys.

(No Model.) 3 Sheets—Sheet 3.

T. COLDWELL.
LAWN MOWER.

No. 426,984. Patented Apr. 29, 1890.

Witnesses:
Jas. E. Hutchinson.
Henry C. Hazard.

Inventor.
Thos. Coldwell, by
Chindler & Russell, his Attys

UNITED STATES PATENT OFFICE.

THOMAS COLDWELL, OF NEWBURG, NEW YORK.

LAWN-MOWER.

SPECIFICATION forming part of Letters Patent No. 426,984, dated April 29, 1890.

Application filed November 2, 1887. Serial No. 254,107. (No model.)

*To all whom it may concern:*

Be it known that I, THOMAS COLDWELL, of Newburg, in the county of Orange, and in the State of New York, have invented certain new and useful Improvements in Lawn-Mowers; and I do hereby declare that the following is a full, clear, and exact description thereof, reference being had to the accompanying drawings, in which—

Figure 1:
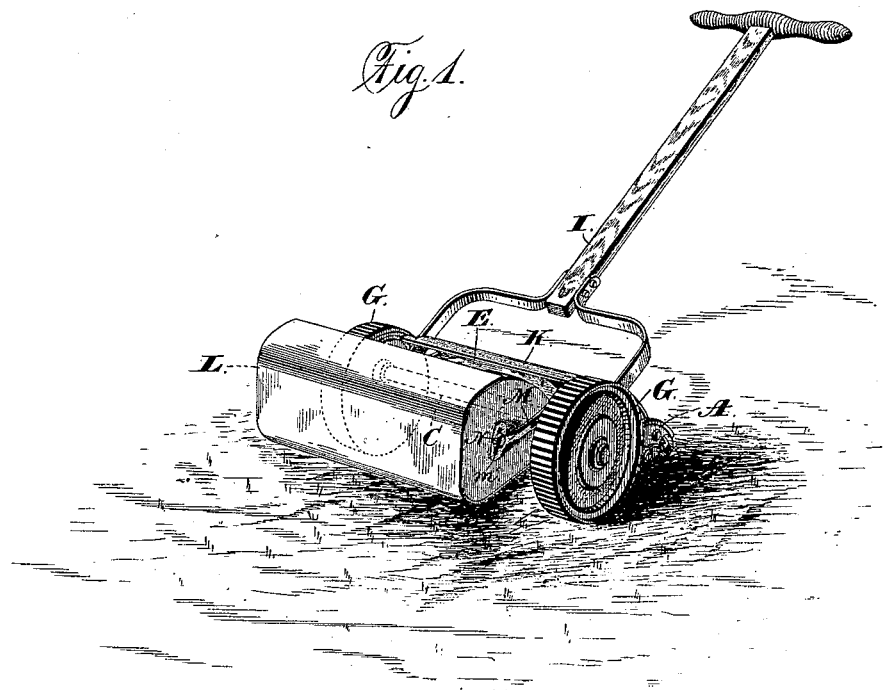
Figure 2:
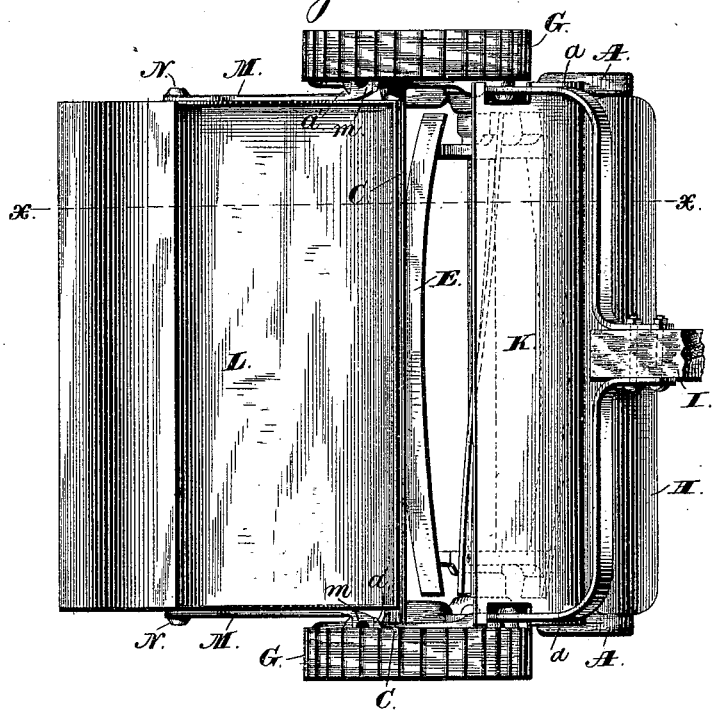
Figure 3:
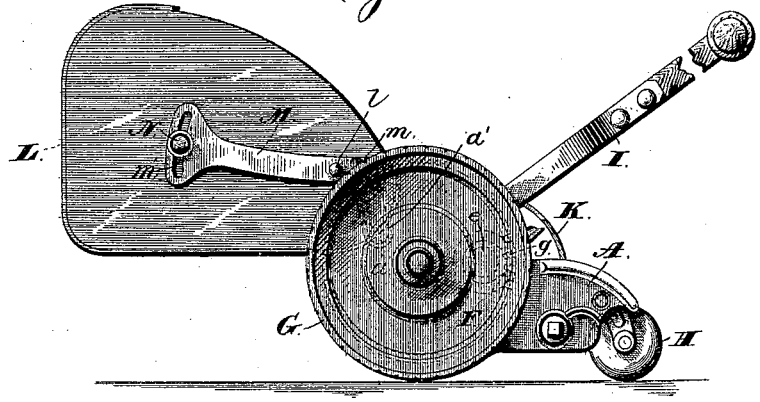
Figure 4:
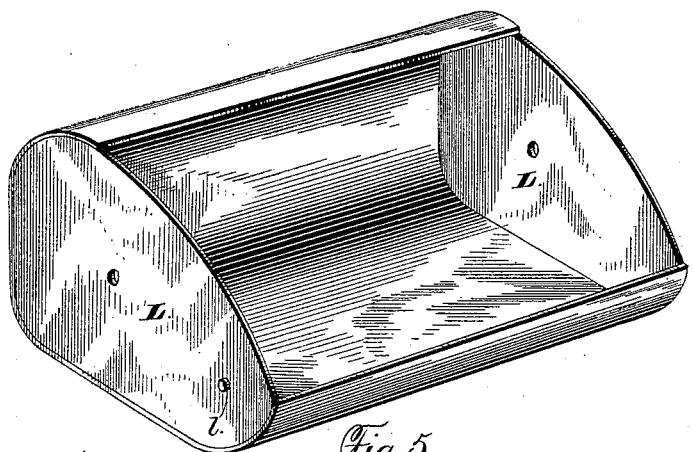
Figure 5:
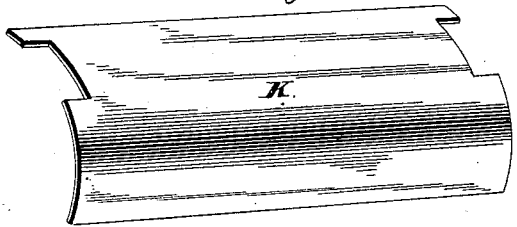
Figure 6:
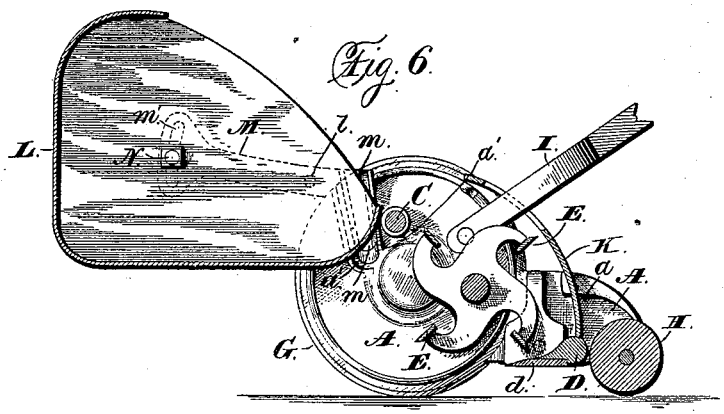

Figure 1 is a perspective view of a lawn-mower having my improvements in position for use. Fig. 2 is a plan view of the same. Fig. 3 is a side elevation of said lawn-mower. Figs. 4 and 5 are respectively perspective views of the grass-box and shield separated from the machine, and Fig. 6 is a section upon line $x\ x$ of Fig. 2.

Letters of like name and kind refer to like parts in each of the figures.

The design of my invention is to furnish a simple, cheap, and efficient means whereby the grass cut by a lawn-mower may be prevented from falling upon the ground and deposited in a convenient receptacle; to which end my said invention consists in the device constructed and operating as hereinafter described and claimed.

My improvements are applicable to any of the usual forms of lawn-mower; but it will be sufficient to illustrate the principle of their operation in connection with one of such forms, in which the side frames A and A are combined and secured in relative positions by means of a brace-rod C, that extends between their front upper portions, and a knife-bar D, which extends between their rear ends.

At a point above and in front of the knife-bar D, which carries a stationary cutter $d$, is a revolving cutter E, that is journaled within and extends between the side frames A and A, and upon each of its projecting journals $e$ is a ratchet-connected pinion F, while upon the outer side of each side frame A is journaled a ground-wheel G, which is provided with internal gear-teeth $g$, that mesh with the teeth of said pinions, and when the machine is moved forward operates to rotate said journaled cutter in the usual manner. A small roller H, journaled at the rear end of the frame, and a forked handle I, secured to the upper rear side of the same, completes the machine, which neither as a whole nor in the details of its construction is herein claimed.

In the practical operation of the lawn-mower described, most of the cut grass is, by the action of the revolving cutter, carried upward and forward, and in order that the entire amount thus cut may be thrown to the front I employ at the rear of said revolving cutter a shield K, which is preferably constructed from sheet-iron, extends longitudinally between the side frames A and A, and from the upper side at the rear edge of the knife-bar D extends in a curve upward and forward to or near the upper side of said revolving cutter. Each end of said shield is contained within a correspondingly-curved groove $a$, that is provided in the inner face of the contiguous side frame, and said shield may be readily placed in or removed from position by being moved vertically within said grooves.

The shield described operates to direct such grass as would otherwise fall in rear of the machine upward and forward, where, in connection with the grass which is carried over by the revolving cutter, it is caught by a box L, that is arranged at the front of the machine. Said box is preferably constructed from sheet-iron in the form shown, its bottom, ends, rear side, and a portion of its front and upper sides being closed, while within said upper and front sides is an opening through which the grass enters. The grass-box L has a length slightly less than the distance between the side frames A and A, and upon each end has a flat bar or arm M, which has in side elevation the form shown in Fig. 3, its rear end being provided with a tongue $m$, that projects downward, while its front end is expanded vertically, and within the same is formed a vertical slightly-curved slot $m'$. The box L is provided upon each side, near the rear end thereof, with a stud or pin $l$, whereby it is pivotally supported upon the bars M, so as to be capable of being vertically adjusted. Said box, when adjusted to a desired position, may be firmly secured therein by means of a bolt N, which passes through the slot $m'$ and through the side of the box. The tongue $m$ of each bar M decreases slightly in width from its upper end downward, and within the inner face of each side frame A is formed a correspondingly-shaped groove a', into which the tongue upon the corresponding bar may be placed, the taper of said tongue and groove being sufficient to cause the former to be held firmly within the latter by its weight. As thus constructed and combined with the side frame, the tongue-bar is held in a substantially horizontal position, and in turn furnishes a support for the grass-box. By loosening the binding-bolt the portion of said box in rear of the pivotal connection between the same and said bar may be raised or lowered to cause it to occupy the necessary position with reference to the surface of the ground, it being necessary to make such adjustment whenever the back roller is changed vertically for the purpose of varying the height of the cut of the machine.

With the shield and grass-box in place the cut grass will be deposited in the box instead of falling upon the ground, and when said box is full it may be detached for emptying by simply raising it until the tongues of the suspensory bars are lifted from out their sockets.

Having thus described my invention, what I claim is—

1. In combination with the frame of a lawn-mower, the grass-box-supporting arms or bars attached thereto, and the grass-box suspended between such bars on pivotal bearings, so as to be vertically adjustable, and provided with means to secure it in position when adjusted, substantially as and for the purpose specified.

2. In combination with a lawn-mower, a grass-box adjustably supported on arms or bars that are removably connected to the mower-frame, substantially as and for the purpose shown.

3. In combination with the frame of a lawn-mower and with each other, a grass-box, supporting devices therefor, consisting of two horizontally-arranged bars or arms, to which said box is pivoted so as to be vertically adjustable, and means for securing said box in position when adjusted thereto, substantially as and for the purpose shown and described.

4. As an improvement in attachments for lawn-mowers, a grass-box that is provided at each side with horizontal supporting bars or arms, which have at their rear ends downwardly-extending portions or tongues adapted for engagement with grooves in the side frames, substantially as and for the purpose specified.

5. A lawn-mower provided with a stationary and a revolving cutter, in combination with a shield that extends parallel with and in rear of the revolving cutter, and a grass-box which is supported in front of the latter by two horizontally-arranged arms, said box being pivoted to said bars so as to be vertically adjustable, and provided with means to secure it in position when adjusted, substantially as and for the purpose set forth.

6. In combination with a lawn-mower, bars or arms connected thereto and slotted at their ends, a grass-box pivotally suspended between said bars or arms, and bolts passing through the slots in said bars or arms and through the sides of said box, substantially as and for the purpose shown.

7. In combination with the frame of a lawn-mower and with each other, a grass-box and supporting devices therefor, consisting of two bars or arms having at their ends tapering tongues engaging similarly-shaped grooves in the sides of the frame, substantially as and for the purpose set forth.

In testimony that I claim the foregoing I have hereunto set my hand this 24th day of January, 1887.

THOMAS COLDWELL.

Witnesses:
LEWIS M. SMITH,
JOHN E. WHITEHILL.